(12) United States Patent
Youn

(10) Patent No.: US 8,102,913 B2
(45) Date of Patent: Jan. 24, 2012

(54) DCT/Q/IQ/IDCT BYPASS ALGORITHM IN MPEG TO AVC/H.264 TRANSCODING

(75) Inventor: Jeongnam Youn, San Jose, CA (US)

(73) Assignees: Sony Corporation, Tokyo (JP); Sony Electronics, Inc,, Parkridge, NJ (US)

( * ) Notice: Subject to any disclaimer, the term of this patent is extended or adjusted under 35 U.S.C. 154(b) by 1432 days.

(21) Appl. No.: 11/644,450

(22) Filed: Dec. 22, 2006

(65) Prior Publication Data

US 2008/0151995 A1 Jun. 26, 2008

(51) Int. Cl.
*H04N 7/12* (2006.01)
(52) U.S. Cl. ............ 375/240.08; 375/240.03; 375/240.2
(58) Field of Classification Search .................. 375/240, 375/240.01, 240.03, 240.08, 240.12, 240.2; 382/232
See application file for complete search history.

(56) References Cited

U.S. PATENT DOCUMENTS

| 6,748,113 | B1 * | 6/2004 | Kondo et al. ................. 382/232 |
| 2002/0054640 | A1 * | 5/2002 | Boon ....................... 375/240.08 |
| 2008/0043831 | A1 * | 2/2008 | Sethuraman et al. ......... 375/240 |

FOREIGN PATENT DOCUMENTS

WO WO 2006047936 A1 5/2006

OTHER PUBLICATIONS

Kim, Gyu Yeong et al; An Early Detection of All-Zero DCT Blocks in H.264; International Conference on Image Processing; 2004; vol. 1; pp. 435-456.
Kim Yangsoo et al.; Fast Mode Decision Algorithm for H.264 Using AZCB Prediction; International Conference on Consumer Eletronics;2006; pp. 33-34.
Dong-Hau, Liu et al.; A New All-Zero 4×4 Block Determination Rule for Integer Tranform and Quantization in AVS-M Encoder; 2006; vol. 7, sup. 1; pp. 89-94.

* cited by examiner

*Primary Examiner* — Allen Wong
(74) *Attorney, Agent, or Firm* — Trellis IP Law Group, PC

(57) ABSTRACT

In one embodiment, a first DCT block of coefficients is received from a transcoding process. The DCT block is of a first size, such as an 8×8 size, and in a first coding standard, such as MPEG-2. A distribution of zero and non-zero coefficients is then determined from the first DCT block. For example, areas where non-zero coefficients are found may be determined. This may simplify a corresponding sum of absolute difference (SAD) calculation. The SAD is then calculated for a second DCT block of a second size, such as a 4×4 size block, in a second coding standard, such as AVC. The SAD is determined from the coefficients in the first DCT block. Accordingly, the SAD is determined without performing an inverse DCT on the 8×8 block and then computing the SAD for a 4×4 block. It is then determined if a bypass of a DCT operation for the 4×4 block can be performed based on the SAD computed. For example, the SAD is compared to a threshold to determine if a bypass can be performed. In one example, if the coefficients for each 4×4 block are determined that they may be quantized to zero, then the DCT operation may be bypassed. Also, quantization, inverse quantization, and inverse DCT steps may also be bypassed.

20 Claims, 3 Drawing Sheets

DCT/Q/IQ/IDCT BYPASS ALGORITHM IN MPEG TO AVC/H.264 TRANSCODING

BACKGROUND OF THE INVENTION

Particular embodiments generally relate to transcoding, and more particularly to determining if a discrete cosine transform (DCT) operation in a transcoding process can be bypassed.

Transcoding is a digital-to-digital conversion from one format of video sequence to another format of video sequence. For example, transcoding may be performed from a motion picture experts group (MPEG)-2 bit stream to an advanced video coding (AVC) bit stream. Transcoding typically involves decoding/decompressing the MPEG-2 bit stream and then re-encoding it, using an AVC encoder, into an AVC bit stream.

The MPEG-2 bit stream contains an 8×8 DCT block of coefficients. However, the encoding loop of the AVC requires that a 4×4 DCT block of coefficients be computed. Thus, from the MPEG-2 bit stream, DCT coefficients for an 8×8 block are found, but DCT coefficients for a 4×4 block are needed.

The 8×8 block already has a motion vector computed in the MPEG-2 bit stream. However, the motion vector for the 8×8 block cannot be used for a 4×4 block in AVC. To compute the motion vector for the 4×4 block, an inverse DCT (IDCT) must be performed for the 8×8 block. Then, a sum of absolute difference (SAD) may be computed from the IDCT for the 4×4 block. Computing the IDCT is a computationally expensive step, but the SAD is needed to determine the motion vector for the 4×4 DCT.

SUMMARY

Particular embodiments generally relate to determining if a bypass of a DCT operation can be performed in a transcoding process.

In one embodiment, a first DCT block of coefficients is received from a transcoding process. The DCT block is of a first size, such as an 8×8 size, and in a first coding standard, such as MPEG-2. A distribution of zero and non-zero coefficients is then determined from the first DCT block. For example, areas where non-zero coefficients are found may be determined. This may simplify a corresponding sum of absolute difference (SAD) calculation. The SAD is then calculated for a second DCT block of a second size, such as a 4×4 size block, in a second coding standard, such as AVC. The SAD is determined from the coefficients in the first DCT block. Accordingly, the SAD is determined without performing an inverse DCT on the 8×8 block and then computing the SAD for a 4×4 block. It is then determined if a bypass of a DCT operation for the 4×4 block can be performed based on the SAD computed. For example, the SAD is compared to a threshold to determine if a bypass can be performed. In one example, if the coefficients for each 4×4 block are determined that they may be quantized to zero, then the DCT operation may be bypassed. Also, quantization, inverse quantization, and inverse DCT steps may also be bypassed.

A further understanding of the nature and the advantages of particular embodiments disclosed herein may be realized by reference of the remaining portions of the specification and the attached drawings.

DETAILED DESCRIPTION OF EMBODIMENTS OF THE INVENTION

Particular embodiments provide techniques to efficiently speed up an overall transcoding process from a first coding standard to a second coding standard, such as from MPEG-2 to AVC/H.264. Particular embodiments will be described using MPEG-2 and AVC; however, it will be understood that other coding standards will be appreciated. For example, further advances in MPEG-2 and AVC will be appreciated in addition to other coding standards. In one embodiment, any coding standards that may use different sized DCT blocks of coefficients (or simply "blocks") may be appreciated.

In one embodiment, an incoming bit stream includes an 8×8 DCT block in an MPEG-2 syntax. However, an encoding loop in AVC requires that a 4×4 DCT block be computed. This is because AVC may be encoded using 4×4 DCT blocks. The full computation of the 4×4 DCT blocks may not be desirable due to the computational complexity, such as an IDCT may have to be performed to determine the 4×4 block.

Particular embodiments approximate the 4×4 DCT block from the 8×8 DCT block. Because the converted data is not used in an encoding loop as encoded data, it does not have to be accurate. This is because the encoder and decoder share the IDCT but the DCT is not a part in the decoder. This means there will not be any mismatching if DCT is not accurate. Particular embodiments may detect a distribution of non-zero coefficients in the 8×8 DCT block. This distribution may be used to simplify an SAD calculation. For example, if the zero coefficients are found in a 4×4 DCT block, then an SAD may not need to be calculated.

Particular embodiments provide a bypass method using a pattern detection of non-zero coefficients. After the pattern detection is performed, an SAD may be computed and compared to threshold values to determine if the bypass of a DCT step can be performed or not. Also, quantization (Q), inverse quantization (IQ) and/or IDCT steps may also be bypassed. For example, if it is determined that all the coefficients are zero after the DCT, then the other processes, Q, IQ, and IDCT, can be skipped because all the results after each process will produce zeroes.

Figure 1:
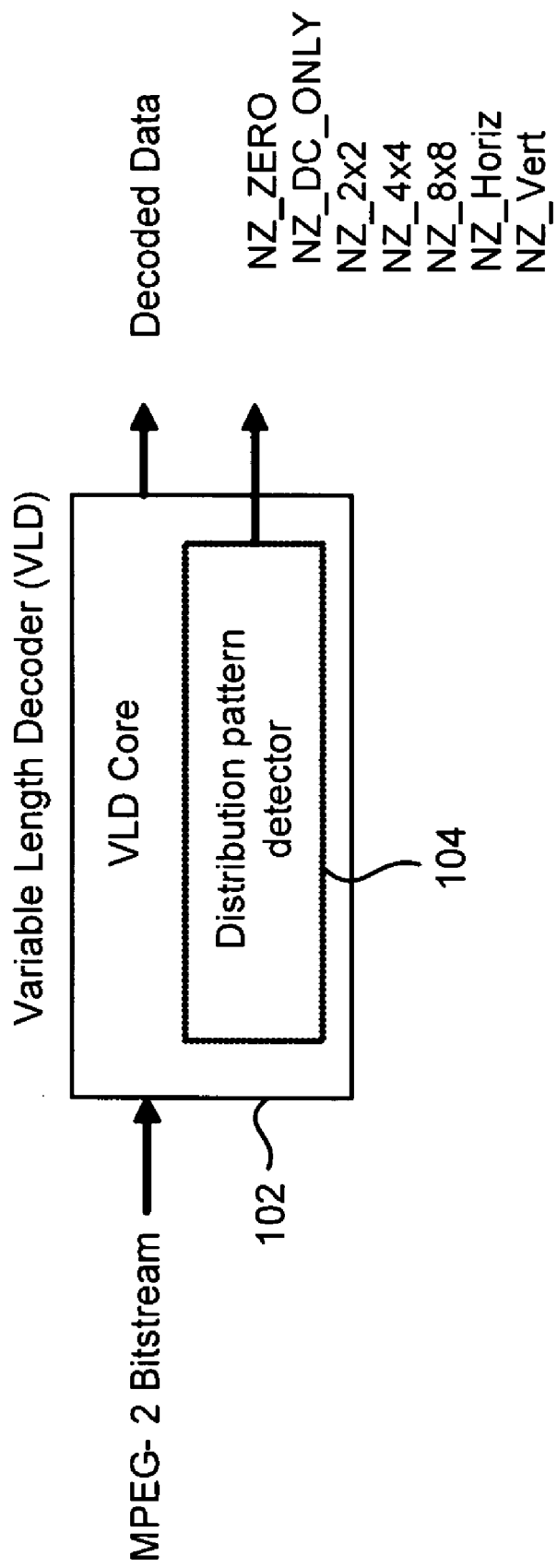
FIG. 1 depicts a variable length decoder that may be used to determine a distribution of DCT coefficients according to one embodiment.

FIG. 1 depicts a variable length decoder 102 that may be used to determine a distribution of DCT coefficients according to one embodiment. As shown, variable length decoder 102 includes a distribution pattern detector 104. In one embodiment, variable length decoder 102 may be implemented in hardware, software, or any combination thereof. Variable length decoder 102 is configured to receive an MPEG-2 bit stream and output decoded data. Further, distribution pattern detector 104 is configured to take DCT coefficients found in 8×8 blocks of the MPEG-2 bit stream and detect distribution patterns of non-zero coefficients.

Distribution pattern detector 104 may output different values based on a pattern detected. Example values are shown in Table 1.

TABLE I

| Symbol | Meaning |
| --- | --- |
| NZ_ZERO | All the coefficients are zero |
| NZ_DC_ONLY | All the AC coefficients are zero |

TABLE I-continued

| Symbol | Meaning |
| --- | --- |
| NZ__2 × 2 | Non-zero coefficients in 2 × 2 block (except DC) |
| NZ__4 × 4 | Non-zero coefficients in 4 × 4 block (except DC) |
| NZ__8 × 8 | Non-zero coefficients in 8 × 8 block (except DC) |
| NZ__Horiz | Non-zero coefficients in the first row (except DC) |
| NZ__Vert | Non-zero coefficients in the first column (except DC) |

The values indicate that all coefficients are zero, all the AC coefficients are zero, non-zero values may be found in a 2×2 block, 4×4 block, 8×8 block, in a first row, in a first column, etc. Other patterns may also be detected and appreciated.

In one example, if the incoming 8×8 block has all zero coefficients, then the output of distribution detector 204 may be NZ_zero. In this case, the zero coefficients, if they were to undergo a DCT/Q/IQ/IDCT in an encoding loop, would still be zero. Thus, no further computation is needed for the operations.

Figures 2A, 2B, 2C:
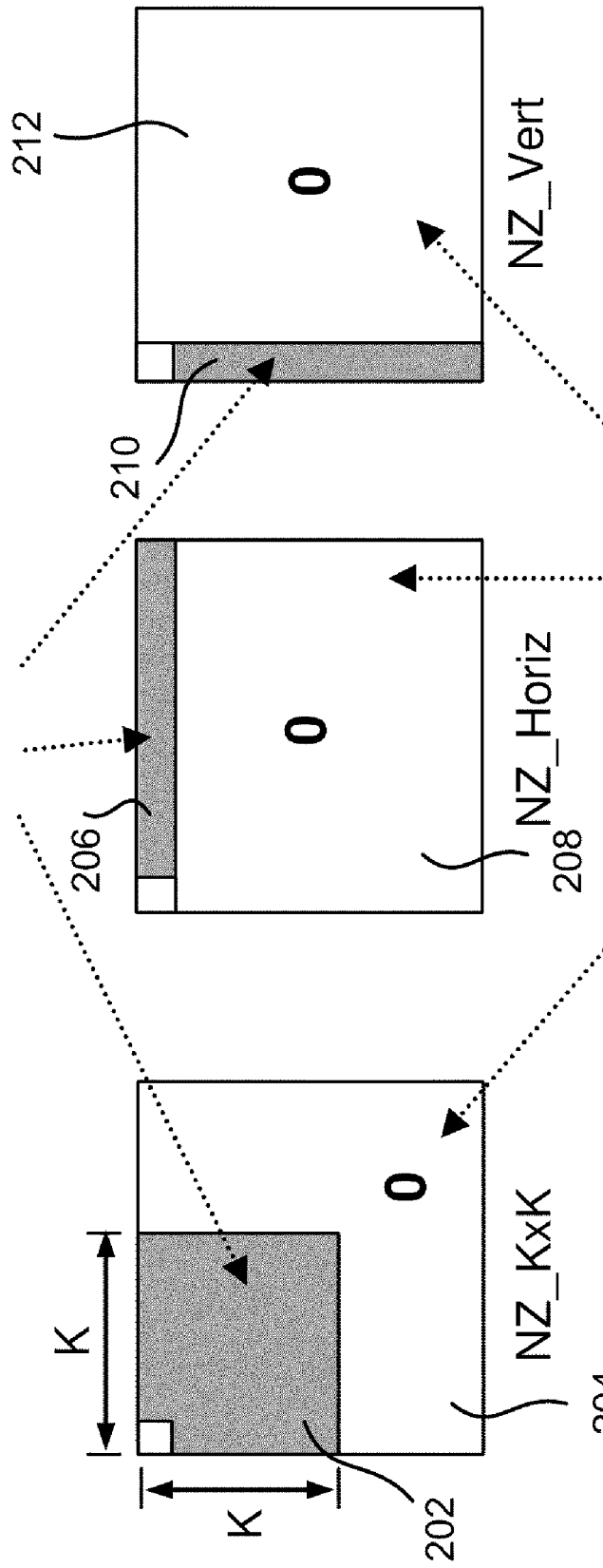
FIGS. 2A-2C show different patterns for DCT coefficients according to one embodiment.

By detecting the distribution pattern of non-zero values, the computation of the SAD for a 4×4 block in the AVC coding process may be simplified. Different patterns are shown in FIGS. 2A-2C. In FIG. 2A, a block 202 includes at least one non-zero coefficient. Block 202 may be of a size of K×K. In area 204, it is known that there are zero coefficients. Area 202 may be a size of, for example, 2×2, 4×4, or 8×8. If a 4×4 block is found in area 204, then all the coefficients may be zero. Thus, the SAD of this block will be zero and the SAD of the block does not need to be performed. Also, if the 4×4 block is part of area 202, there may be non-zero coefficients. In this case, the SAD may need to be determined. However, if the non-zero coefficients can be narrowed to a certain area, such as in a 2×2 block, then the SAD may be taken for the 2×2 block. This is an easier calculation than calculating the SAD for a 4×4 block. Thus, the SAD calculation is simplified based on the distribution pattern.

In FIG. 2B, an area 206 includes non-zero coefficients and an area 208 includes zero coefficients. In this case, a first row may include the non-zero coefficients and corresponds to the symbol NZ_Horz. If the 4×4 blocks for the bottom half of the 8×8 block are being considered, it can be determined that zero coefficients may be included in both of the bottom two blocks. Thus, it can be determined that the coefficients for both of the 4×4 blocks may be zero after the DCT/Q/IQ/IDCT operations. Thus, these operations may be bypassed.

In FIG. 2C, an area 210 may include one or more non-zero coefficients and area 212 includes zero coefficients. This distribution may correspond to the symbol NZ_Vert. In this case, non-zero coefficients may be found in the first column. In FIG. 2C, 4×4 blocks for the right side of the 8×8 block may include all zero coefficients. Also, in FIG. 2A, 4×4 blocks outside of area 202 may include all zero coefficients.

Figure 3:
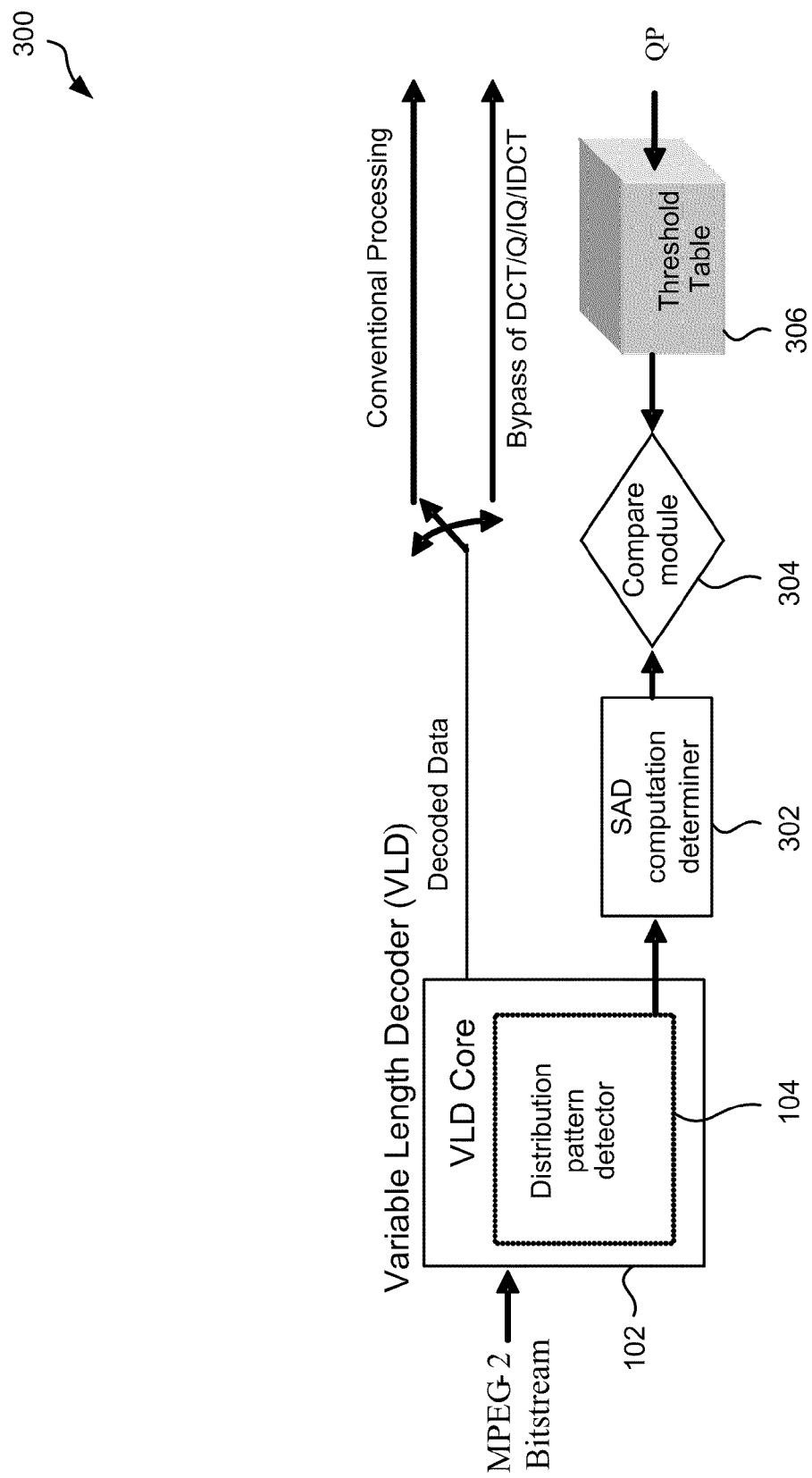
FIG. 3 depicts a simplified system for determining if a bypass can be performed according to one embodiment.

Once the pattern distribution is determined, a bypass of the DCT step is determined. FIG. 3 depicts a simplified system 300 for determining if a bypass can be performed according to one embodiment. As shown, system 300 includes variable length decoder 102, SAD computation determiner 302, a compare module 304, and a threshold table 306.

As shown, variable length decoder 102 receives the MPEG-2 bit stream and outputs decoded data. The decoded data may be sent to conventional processing where an 8×8 block may have an IDCT performed. Then a 4×4 DCT block may be determined and an SAD computed for the 4×4 DCT block. The DCT/Q/IQ/IDCT steps may then be performed for compressing the decoded data in AVC.

Also, a bypass of the DCT/Q/IQ/IDCT steps may be performed. Distribution pattern detector 104 outputs one of the symbols as described above in FIG. 1 and Table 1. SAD computation determiner 302 is then configured to compute an SAD for a 4×4 block in AVC. The position of sufficiently large non-zero coefficients of a 4×4 DCT is predicted as described above. Once the position of non-zero coefficients is determined, the behavior of non-zero coefficients is determined with respect to quantization. If it is determined that all the non-zero coefficients can be quantized to zero, then the DCT operation may be skipped in an encoding process. Also, the SAD computation may be simplified as described above.

One of the major different features between MPEG-2 and AVC is that the sizes of transformed kernels are different. In MPEG-2, an 8×8 DCT is used, but, in AVC, a 4×4 DCT is used. Due to the different transformed kernels, the computational complexity of determining the 4×4 DCT from the 8×8 DCT is significant. To implement a fast transcoder, it is desirable to reduce the transform operations.

The following represents an example computation to determine an SAD for a 4×4 block from the 8×8 block received in the MPEG-2 bit stream. Particular embodiments may avoid the full computation of a 4×4 DCT. For example, if an 8×8 DCT contains only a DC component, the 4×4 DCT (whether the block is INTRA or INTER), it is likely only to have a DC component as long as the outgoing bit rate is lower than the bit rate of the outgoing bit stream. Thus, if only a DC component is included, it is to be determined that the block includes zero coefficients for the AC component.

The computation of coefficients for a 4×4 DCT requires partial information of a full 8×8 DCT. For example, the DC components of 4×4 blocks can be obtained directed from only the DC and the first order coefficient of the 8×8 DCT. Different coefficients in the 8×8 DCT can be identified that affect the final result of a 4×4 DCT. These coefficients may be used to determine the 4×4 DCT using a partial computation. Thus, computations can be reduced to determine the 4×4 DCT.

Table II shows examples of a 4×4 DCT that are determined using 8×8 DCT coefficients. As shown, the first block, second block, third block, and fourth block may be determined based on the value of "y," which represents the 8×8 DCT coefficients. The variable "z" represents the 4×4 DCT coefficients.

TABLE II

First block:

$z_{11} = (y_{11} + y_{12}) + (y_{21} + y_{22})$
$z_{12} = (y_{12} + y_{22}) + 2(y_{13} + y_{23}) + 2(y_{14} + y_{24}) - (y_{16} + y_2)$
$z_{13} = (y_{14} + y_{24}) + (y_{15} + y_{25}) + (y_{16} + y_{26}) - (y_{18} + y_{28})$
$z_{14} = (y_{16} + y_{26}) + 2(y_{17} + y_{27}) + 2(y_{18} + y_{28})$ (1)

Second block:

$z_{11} = (y_{11} + y_{12}) - (y_{21} + y_{22})$
$z_{12} = (y_{12} + y_{22}) - 2(y_{13} + y_{23}) + 2(y_{14} + y_{24}) - (y_{16} + y_{26})$
$z_{13} = -(y_{14} + y_{24}) + (y_{15} + y_{25}) - (y_{16} + y_{26}) + (y_{18} + y_{28})$
$z_{14} = (y_{16} + y_{26}) - 2(y_{17} + y_{27}) + 2(y_{18} + y_{28})$ (2)

Third block:

$z_{11} = (y_{11} - y_{12}) + (y_{21} - y_{22})$
$z_{12} = (y_{12} - y_{22}) + 2(y_{13} - y_{23}) + 2(y_{14} - y_{24}) - (y_{16} - y_{26})$
$z_{13} = (y_{14} - y_{24}) + (y_{15} - y_{25}) + (y_{16} - y_{26}) - (y_{18} - y_{28})$
$z_{14} = (y_{16} - y_{26}) + 2(y_{17} - y_{27}) + 2(y_{18} - y_{28})$ (3)

Fourth block:

$z_{11} = (y_{11} - y_{12}) - (y_{21} - y_{22})$
$z_{12} = (y_{12} - y_{22}) - 2(y_{13} - y_{23}) + 2(y_{14} - y_{24}) - (y_{16} - y_{26})$
$z_{13} = -(y_{14} - y_{24}) + (y_{15} - y_{25}) - (y_{16} - y_{26}) + (y_{18} - y_{28})$
$z_{14} = (y_{16} - y_{26}) - 2(y_{17} - y_{27}) + 2(y_{18} - y_{28})$ (4)

In general, one 8×8 DCT block generates four separate 4×4 blocks. Therefore, four separate bypass detection procedures are needed for each 8×8 block. But, looking at equations (1)-(4), it may be determined that one of the blocks may produce the largest SAD, such as the first block. Thus, instead of a separate detection, the first block may be checked and the other computations of the other blocks may be skipped. This is because, if the SAD value of the other blocks is less than that of the first block and the first block SAD value is smaller than the threshold defined in equation (4), then it may be determined that all the blocks have an SAD value less than the threshold. Thus, the first block may be referred to as the dominant sub-block.

To obtain the SAD from an 8×8 DCT block, equation (5) may be expressed as:

$$z_{ij} = \sum_{m=1}^{8}\sum_{n=1}^{8} a_{ij} y_{ij} \quad (5)$$

Equation (5) implies that 4×4 DCT coefficients may be obtained by a linear combination of 8×8 DCT coefficients. Also, it should be noted that, in most cases, values of $a_{ij}$ may be zero. Using equation (5), the SAD can be derived as:

$$SAD|_z = \sum_{m=1}^{4}\sum_{n=1}^{4}|z_{ij}| = \sum_{m=1}^{4}\sum_{n=1}^{4}\left|\sum_{x=1}^{8}\sum_{y=1}^{8} a_{xy} y_{xy}\right| \quad (6)$$

Compare module 304 receives the SAD computation from SAD computation determiner 302. Further, a threshold table 306 is received. The threshold table may be computed based on a quantization parameter (QP). The QP value is determined from the rate control used in an encoding process. For example, threshold values may be computed in which, if the SAD computed is less than the threshold's value, then a bypass may be determined.

If compare module 304 determines that a bypass is determined based on the comparison from the SAD value to the threshold (i.e., the SAD is smaller than the threshold's value), then a bypass of the DCT/Q/IQ/IDCT operations may be performed. This bypass may indicate that all zero values may result if these operations were performed. If the SAD value is larger than the threshold, then conventional processing is applied.

The maximum number of additions required is 16 and some more shift operations for the multiplication of 2 is required. Because the only required operations are addition and shift, this may be implemented in hardware with variable length decoder 202. Other implementations may also be provided in software, hardware, or any combination thereof.

Once the SAD for a 4×4 block is determined, it is compared to a threshold value. In AVC/H.264, a 4×4 DCT coefficient may be represented as $w_{ij}$ and the corresponding quantized coefficient as $z_{ij}$. The quantization process can be described as:

$$|z_{ij}| = (|w_{ij}| \cdot m + f) \quad (7)$$

where $m = f(QP\%6, i, j)$, $$f = \begin{cases} 2^{b/3} & \text{for Intra block} \\ 2^{b/6} & \text{for Inter block} \end{cases}$$

$b = 15 + (QP/16)$.

From equation (7), if the absolute value of $z_{ij}$ is less than 1, then the coefficient may be quantized to zero. Based on this, a condition that the coefficient is quantized as zero can be expressed as $$\frac{(|w_{ij}| \cdot m + f)}{2^b} < 1 \quad (8)$$

Therefore, the magnitude range of the input coefficient $|w_{ij}|$ that is quantized to be zero is:

$$|w_{ij}| < \frac{2^b - f}{m} \quad (9)$$

With equation (9), and the definition of an SAD, a condition that a coefficient is quantized to be zero may be expressed as:

$$SAD < \frac{2^b - f}{c_i^{max} c_j^{max} \cdot m} \quad (10)$$

The implication of equation (10) is that a 4×4 block will be quantized to be zero if the SAD is smaller than a certain value (e.g., a threshold).

Accordingly, an 8×8 DCT block is analyzed to determine an SAD value for 4×4 blocks. The SAD is compared to a threshold and it is determined if a bypass can be determined. A distribution pattern may be used to simplify the SAD calculation. Accordingly, a bypass method may be determined without computing an IDCT and computing separate SADs from the IDCT for 4×4 DCT blocks. Thus, a transcoding process may become faster and more efficient with less computation or power required.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. A method of determining a bypass of a discrete cosine transform (DCT) operation in a transcoding operation, the method comprising:
    receiving a first DCT block of coefficients from the transcoding operation, the first DCT block being of a first size, the first DCT block being in a first coding standard;
    determining a sum of absolute difference (SAD) for a second DCT block of coefficients by using at least a portion of the coefficients from the first DCT block, the second DCT block being of a second size different from the first size, the second DCT block being in a second coding standard; and
    determining if a bypass of a DCT operation can be performed for the second DCT block based on the SAD computed.

2. The method of claim 1, further comprising determining a coefficient distribution pattern of the coefficients in the first DCT block, wherein the SAD calculation is determined for the second DCT using the coefficient distribution pattern.

3. The method of claim 2, wherein the coefficient distribution pattern determines where non-zero and/or zero coefficients are found in the first DCT block.

4. The method of claim 3, further comprising determining if the second DCT block is in an area of all zero coefficients, wherein the SAD is not performed if all zero coefficients are found in the area.

5. The method of claim 2, wherein the coefficient distribution pattern is a pattern of zero and non-zero coefficients, wherein the SAD calculation is simplified for the second DCT block based on the pattern.

6. The method of claim 1, wherein the SAD is determined without performing an inverse DCT.

7. The method of claim 1, further comprising:
determining one or more threshold values, wherein the threshold values are used to determine if the bypass of the DCT operation can be performed;
comparing the SAD to at least one of the threshold values; and
determining if the bypass of the DCT operation can be performed based on the comparison.

8. The method of claim 1, wherein the first size comprises an 8×8 block and the second size comprises a 4×4 block.

9. The method of claim 1, wherein the first block comprises an MPEG based block and the second block comprises an AVC block, wherein the transcoding operation is from MPEG to AVC.

10. The method of claim 1, wherein the bypass is performed for the DCT, quantization, inverse quantization, and inverse DCT step steps in a coding process in the transcoding operation.

11. An apparatus configured to determine a bypass of a discrete cosine transform (DCT) operation in a transcoding operation, the apparatus comprising:
one or more processors; and
logic encoded in one or more tangible media for execution by the one or more processors, and when executed being operable to:
receive a first DCT block of coefficients from the transcoding operation, the first DCT block being of a first size, the first DCT block being in a first coding standard;
determine a sum of absolute difference (SAD) for a second DCT block of coefficients by using at least a portion of the coefficients from the first DCT block, the second DCT block being of a second size different from the first size, the second DCT block being in a second coding standard; and
determine if a bypass of a DCT operation can be performed for the second DCT block based on the SAD computed.

12. The apparatus of claim 11, wherein the logic when executed is further operable to determine a coefficient distribution pattern of the coefficients in the first DCT block, wherein the SAD calculation is determined for the second DCT using the coefficient distribution pattern.

13. The apparatus of claim 12, wherein the coefficient distribution pattern determines where non-zero and/or zero coefficients are found in the first DCT block.

14. The apparatus of claim 13, wherein the logic when executed is further operable to determine if the second DCT block is in an area of all zero coefficients, wherein the SAD is not performed if all zero coefficients are found in the area.

15. The apparatus of claim 12, wherein the coefficient distribution pattern is a pattern of zero and non-zero coefficients, wherein the SAD calculation is simplified for the second DCT block based on the pattern.

16. The apparatus of claim 11, wherein the SAD is determined without performing an inverse DCT.

17. The apparatus of claim 11, wherein the logic when executed is further operable to:
determine one or more threshold values, wherein the threshold values are used to determine if the bypass of the DCT operation can be performed;
compare the SAD to at least one of the threshold values; and
determine if the bypass of the DCT operation can be performed based on the comparison.

18. The apparatus of claim 11, wherein the first size comprises an 8×8 block and the second size comprises a 4×4 block.

19. The apparatus of claim 11, wherein the first block comprises an MPEG based block and the second block comprises an AVC block, wherein the transcoding operation is from MPEG to AVC.

20. The apparatus of claim 11, wherein the bypass is performed for the DCT, quantization, inverse quantization, and inverse DCT steps in a coding process in the transcoding operation.

* * * * *